(12) United States Patent
Sugimoto

(10) Patent No.: US 7,891,221 B2
(45) Date of Patent: *Feb. 22, 2011

(54) ELECTRIC STEERING LOCK DEVICE

(75) Inventor: Koichiro Sugimoto, Yokohama (JP)

(73) Assignee: Alpha Corporation, Yokohama-shi (JP)

( * ) Notice: Subject to any disclaimer, the term of this patent is extended or adjusted under 35 U.S.C. 154(b) by 251 days.

This patent is subject to a terminal disclaimer.

(21) Appl. No.: 12/232,865

(22) Filed: Sep. 25, 2008

(65) Prior Publication Data

US 2009/0084145 A1    Apr. 2, 2009

(30) Foreign Application Priority Data

Oct. 1, 2007    (JP) .............................. 2007-257875

(51) Int. Cl.
E05B 25/02    (2006.01)

(52) U.S. Cl. .......................................... 70/186; 70/252

(58) Field of Classification Search ........... 70/182–186, 70/252
See application file for complete search history.

(56) References Cited

U.S. PATENT DOCUMENTS

| | | | |
|---|---|---|---|
| 6,915,671 B2 * | 7/2005 | Zillmann | 70/186 |
| 7,021,093 B2 * | 4/2006 | Fukatsu et al. | 70/186 |
| 7,055,351 B2 * | 6/2006 | Suzuki et al. | 70/186 |
| 7,121,126 B2 * | 10/2006 | Zillmann | 70/186 |
| 7,412,858 B2 * | 8/2008 | Tsukano et al. | 70/186 |
| 7,596,976 B2 * | 10/2009 | Sugimoto | 70/186 |
| 2004/0074266 A1 | 4/2004 | Zillmann | |
| 2004/0107750 A1 * | 6/2004 | Fukushima | 70/186 |
| 2005/0034493 A1 * | 2/2005 | Wittwer et al. | 70/186 |
| 2006/0005588 A1 * | 1/2006 | Okuno | 70/186 |
| 2007/0113604 A1 * | 5/2007 | Khoury et al. | 70/186 |
| 2008/0087056 A1 * | 4/2008 | Tsukazaki | 70/182 |
| 2008/0178644 A1 * | 7/2008 | Okuno et al. | 70/187 |
| 2008/0271504 A1 * | 11/2008 | Okada et al. | 70/252 |

FOREIGN PATENT DOCUMENTS

| | | |
|---|---|---|
| EP | 1 637 415 A1 | 3/2006 |
| JP | 2006-044573 | 2/2006 |

\* cited by examiner

*Primary Examiner*—Lloyd A Gall
(74) *Attorney, Agent, or Firm*—The Nath Law Group; Jerald L. Meyer; Robert T. Burns

(57) ABSTRACT

An electric steering lock device of the invention includes: a rotating body (worm wheel) that is driven by a motor to rotate in an unlocking direction and a locking direction; a first cam section and a second cam section provided in the worm wheel; a lock member that follows the first cam section to be displaced between a lock position and an unlock position; and a lever member that follows the second cam section and that is positioned, when the lock member is positioned at the unlock position, at a waiting position at which the lock member is allowed to move and that is positioned, when the lock member is moved to the lock position, at a retention position at which the lock member is blocked from moving to the unlock position.

5 Claims, 8 Drawing Sheets

ELECTRIC STEERING LOCK DEVICE

BACKGROUND OF THE INVENTION

1. Field of the Invention

The present invention relates to an electric steering lock device that locks the rotation of a steering shaft of a vehicle.

2. Description of the Related Art

This type of conventional electric steering lock device is disclosed in Japanese Patent Laid-Open Publication No. 2006-44573. As shown in FIG. 1, this electric steering lock device 100 includes: a lock member 103 that is urged by a coil spring 101 in a direction of a steering shaft 102 of a vehicle and that can be engaged with the steering shaft 102; a rotating body 106 that is connected to and driven by the motor 104 and that has a cam groove 105; a pin 107 that is moved along the cam groove 105 by the rotation of the rotating body 106 to move the lock member 103 between the lock position and the unlock position; and a lock stopper 109 that is moved in conjunction with the operation of the pin 107 and that is urged by a coil spring 108 in a direction of the lock member 103. When the lock member 103 is moved from the unlock position to the lock position in conjunction with the operation of the pin 107, the lock stopper 109 is engaged with a part of the lock member 103. This regulates the movement of the lock member 103 in the unlock direction.

When the above configuration is used to rotate the motor 104 in the locking direction during a parking operation, the rotating body 106 is rotated in the locking direction by the driving force by the motor 104. At the same time, the pin 107 oscillates within the cam groove 105 in accordance with the rotation of the rotating body 106. As a result, the lock member 103 is moved from the unlock position to the lock position. Then, the lock stopper 109 regulates the movement of the lock member 103 in the unlock direction. Consequently, the tip end of the lock member 103 is engaged with the steering shaft 102, thus blocking the rotation of the steering shaft 102. Thus, the vehicle cannot be maneuvered.

When the motor 104 is subsequently rotated in the unlocking direction, the driving force of the motor 104 causes the rotating body 106 to be rotated in the unlocking direction. At the same time, the pin 107 is oscillated within the cam groove 105 in accordance with the reverse rotation of the rotating body 106. This consequently cancels the regulation of the movement of the lock member 103 by the lock stopper 109. Then, the lock member 103 is moved from the lock position to the unlock position. Then, the engagement of the tip end of the lock member 103 with the steering shaft 102 is cancelled, thus allowing the steering shaft 102 to be rotated freely. Thus, the vehicle can be maneuvered.

SUMMARY OF THE INVENTION

In the case of the conventional electric steering lock device 100, when a vehicle is parked, the lock member 103 is arranged to block the rotation of the steering shaft 102 to keep the vehicle in a state that the vehicle cannot be maneuvered so that the parked vehicle is prevented from being stolen. However, the conventional electric steering lock device 100 had a risk of a so-called soft attack where a small through hole is opened in the cover for example of the electric steering lock device 100 and the lock member 103 is directly operated through this hole to move the lock member 103 to the unlock position side, which forcedly cancels the locked status of the steering shaft 102, causing a steal of a parked vehicle.

In view of the above, it is an objective of the present invention to provide an electric steering lock device that can block the lock member, which is engaged with the steering shaft in a locked status, to move to the unlocking direction so that the parked vehicle can be prevented from being stolen.

An electric steering lock device according to the first aspect of the present invention includes: a rotating body that is driven by a driving source to rotate in an unlocking direction and a locking direction; a first cam section and a second cam section provided in the rotating body; a lock member that follows the first cam section to be displaced between a lock position at which the rotation of a steering shaft is blocked and a unlock position at which the rotation of the steering shaft is allowed; a housing and a cover that form a part accommodation room for accommodating the rotating body, the first cam section, the second cam section, and the lock member; and a lever member that slides, while following the second cam section, so as to be able to be engaged with or detached from the lock member. The lever member is structured to be positioned, when the lock member is positioned at the unlock position, at a waiting position at which the lock member is allowed to move, and to be positioned, when the lock member is positioned at the lock position, at a retention position at which the lock member is blocked from being moved to the unlock position.

When the locked status is cancelled in the configuration as described above, the rotating body is firstly driven by the driving source to rotate in the unlocking direction. Then, the first cam section and the second cam section provided in the rotating body are moved in conjunction with this movement. Then, the lever member follows the second cam section and is moved to the waiting position at which the lock member is allowed to move. The lock member follows the first cam section and is displaced from the lock position to the unlock position. As a result, the steering shaft is allowed to rotate and the vehicle can be maneuvered. When locking on the other hand, the rotating body is driven by the driving source to rotate in the locking direction. Then, the lock member follows the first cam section and is displaced from the unlock position to the lock position. Then, the lever member follows the second cam section and is moved to the retention position at which the lock member is blocked from moving to the unlock position. As a result, the steering shaft is blocked by the lock member from rotating and the vehicle cannot be maneuvered. Thus, when locking the lever member is engaged with the lock member fitted to the steering shaft. Therefore, even when someone tries to forcedly draw the lock member in the unlocking direction, the lock member is prevented from moving in the unlocking direction. This prevents the parked vehicle from being stolen.

The lock member also may include an engagement groove that extends in a direction orthogonal to a direction along which the lock member is moved. The lever member also may include an engagement piece that is engaged with the engagement groove when the lock member is positioned at the lock position and the lever member is positioned at a retention position.

When the locked status is cancelled in the configuration as described above, the lever member follows the second cam section provided in the rotating body and is moved to the waiting position at which the lock member is allowed to move. Then, the engagement piece of the lever member is withdrawn from the engagement groove of the lock member. Consequently, the lock member follows the first cam section and can be moved from the lock position to the unlock position. When locking on the other hand, the lock member follows the first cam section and is displaced from the unlock position to the lock position. Then, the lever member follows the second cam section and is moved to the retention position.

As a result, the engagement piece of the lever member is engaged with the engagement groove of the lock member and the lock member is blocked to move from the lock position to the unlock position.

The housing also may include a through hole to which the lock member can be inserted in a retractable manner.

By the configuration as described above, the lock member is firmly supported and can be protected from a destructive behavior where the lock member is operated from the outside to forcedly unlock the lock member.

The lever member also may be covered by the cover.

By the configuration as described above, the lever member can be protected from a destructive behavior where the lever member is operated from the outside to forcedly unlock the lever member.

The electric steering lock device also may further include a drive unit housing and a drive unit cover forming a drive unit room for accommodating the rotating body.

By the configuration as described above, the rotating body (worm wheel) is covered by the drive unit housing and the drive unit cover. Thus, the worm wheel can be blocked from being detached from the outside and is protected from a destructive behavior for forced unlocking.

BRIEF DESCRIPTION OF THE DRAWINGS

FIG. 4A is a cross-sectional view illustrating a locked status. FIG. 4B is a cross-sectional view illustrating a status where an operation of a lever member is started. FIG. 4C is a cross-sectional view illustrating a status where the operation of the lock member is started. FIG. 4D is a cross-sectional view illustrating an unlocked status.

FIG. 5A is a cross-sectional view illustrating the locked status. FIG. 5B is a cross-sectional view illustrating the status where the operation of the lever member is started. FIG. 5C is a cross-sectional view illustrating the status where the operation the lock member is started. FIG. 5D is a cross-sectional view illustrating the unlocked status.

FIG. 6A is a cross-sectional view illustrating the locked status. FIG. 6B is a cross-sectional view illustrating the status where the operation of the lever member is started. FIG. 6C is a cross-sectional view illustrating the status where the operation of the lock member is started. FIG. 6D is a cross-sectional view illustrating the unlocked status.

FIG. 7A is a cross-sectional view illustrating the locked status. FIG. 7B is a cross-sectional view illustrating the status where the operation of the lever member is started. FIG. 7C is a cross-sectional view illustrating the status where the operation of the lock member is started. FIG. 7D is a cross-sectional view illustrating the unlocked status.

DETAILED DESCRIPTION OF PREFERRED EMBODIMENTS

The following section will describe one embodiment of the present invention with reference to the drawings. FIG. 2 to FIG. 10 illustrate one embodiment of the present invention.

Figure 1:
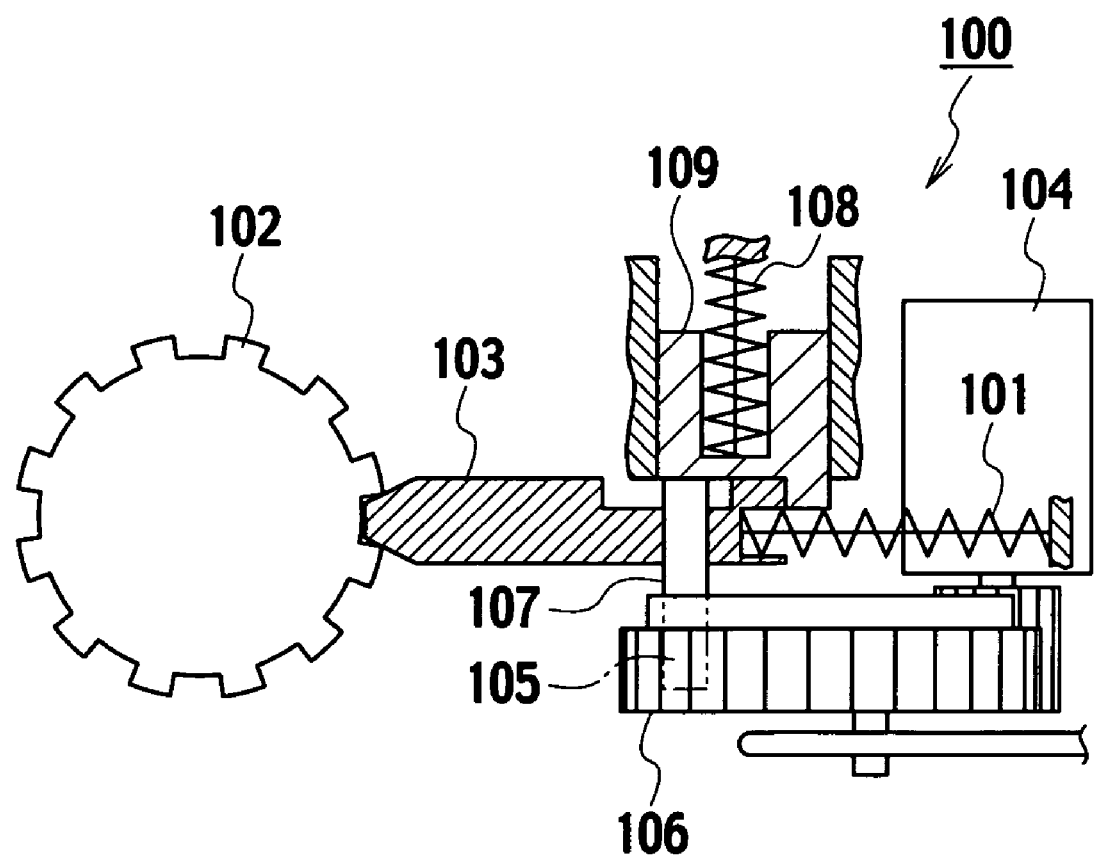
FIG. 1 illustrates an electric steering lock device of a conventional example.
Figure 2:
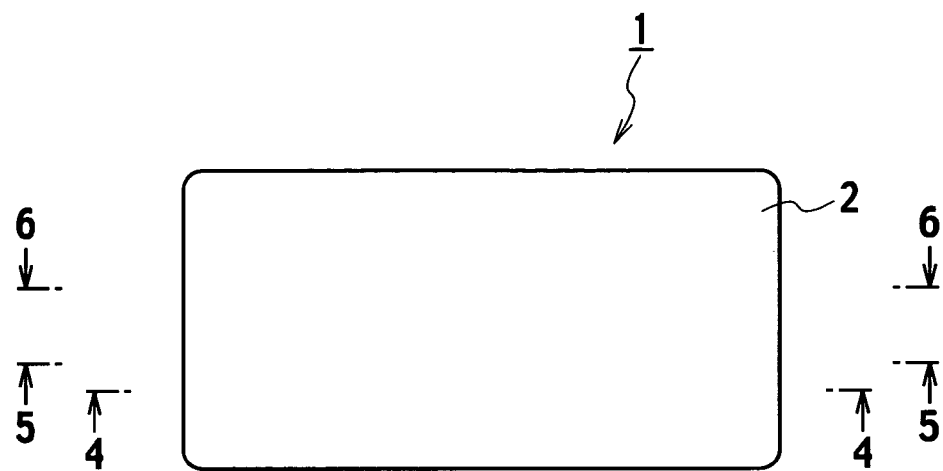
FIG. 2 is a top view illustrating an electric steering lock device according to one embodiment of the present invention.
Figure 3:
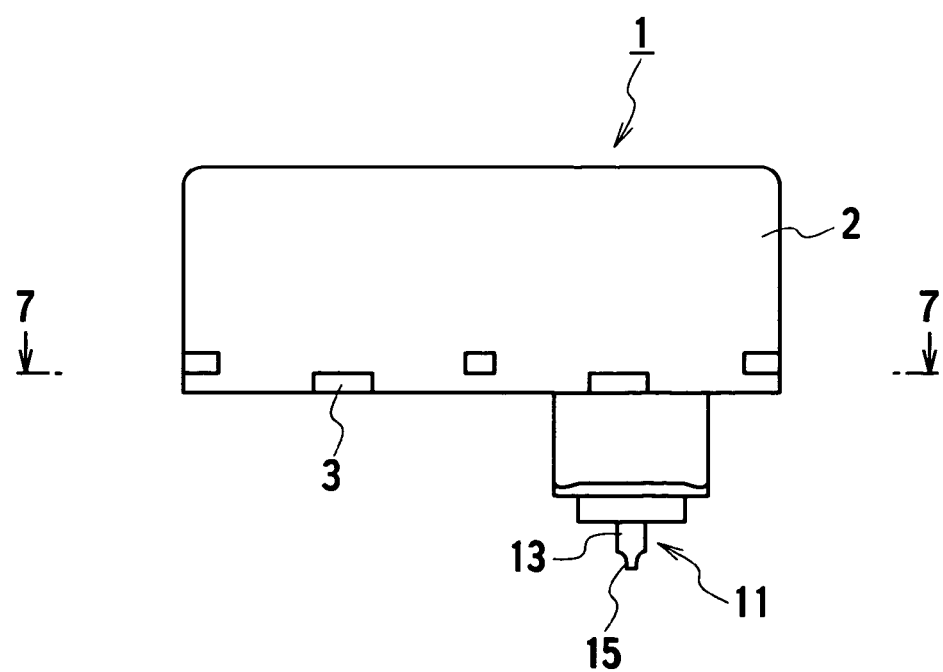
FIG. 3 is a front view illustrating the electric steering lock device according to one embodiment of the present invention.
Figure 4A:
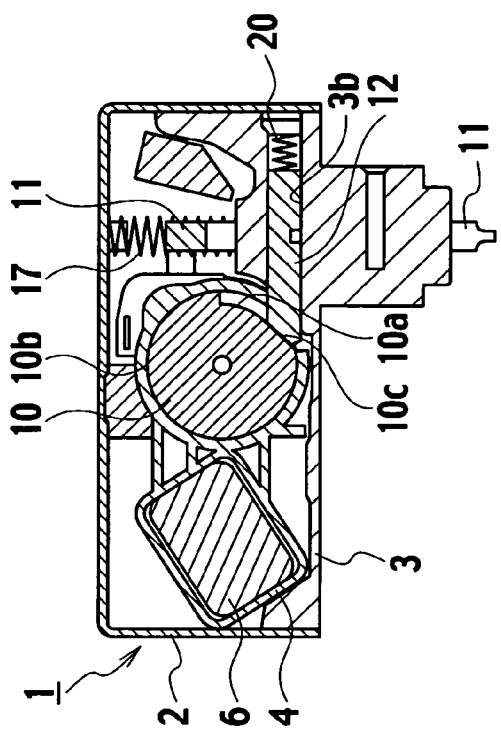
FIGS. 4A to 4D are cross-sectional views illustrating one embodiment of the present invention taken along the line 4-4 of FIG. 2.
Figure 4B:
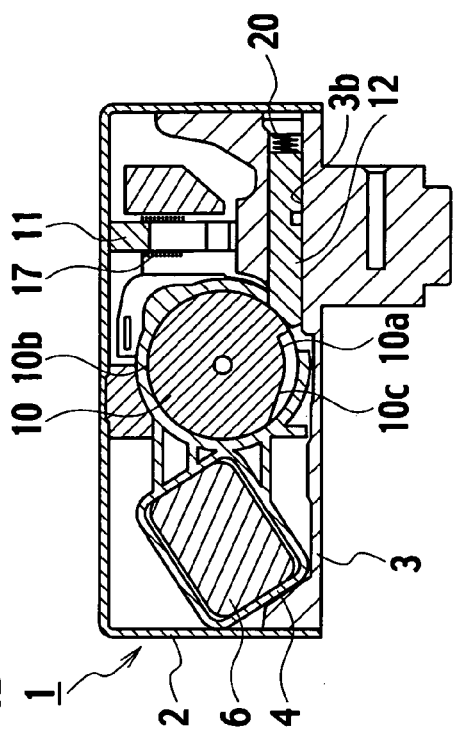
Figure 4C:
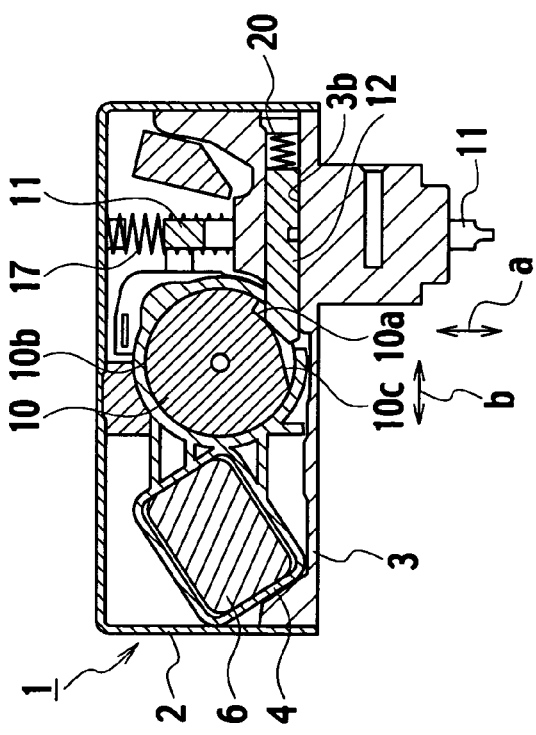
Figure 4D:
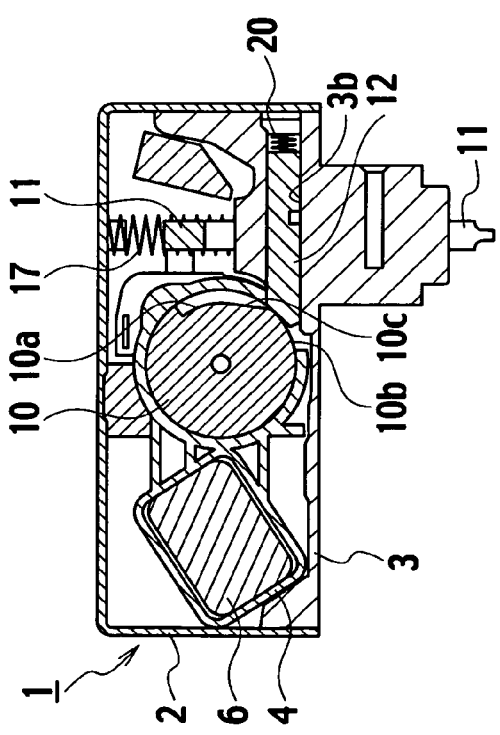
Figure 5A:
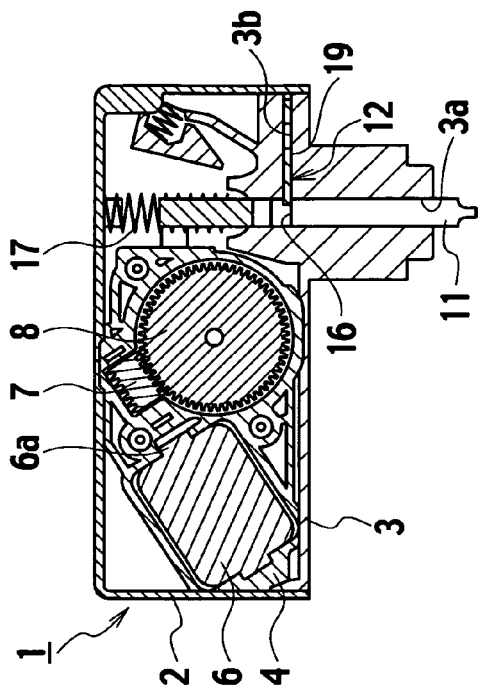
FIGS. 5A to 5D are cross-sectional views illustrating one embodiment of the present invention taken along the line 5-5 of FIG. 2.
Figure 5B:
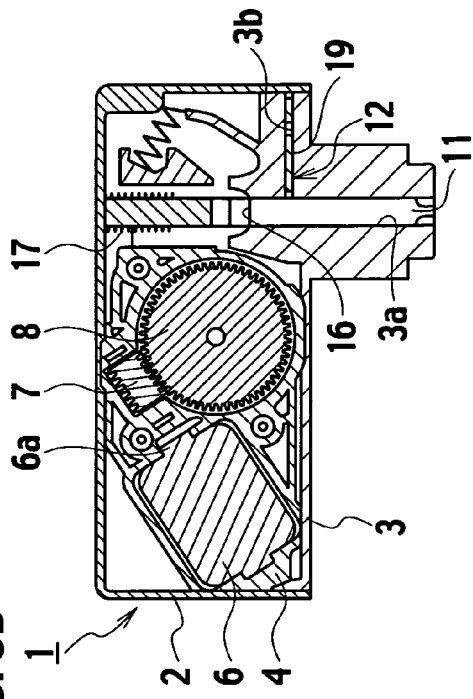
Figure 5C:
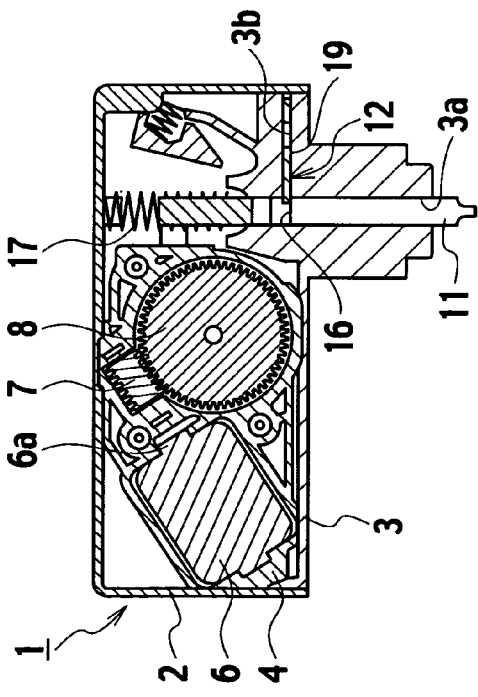
Figure 5D:
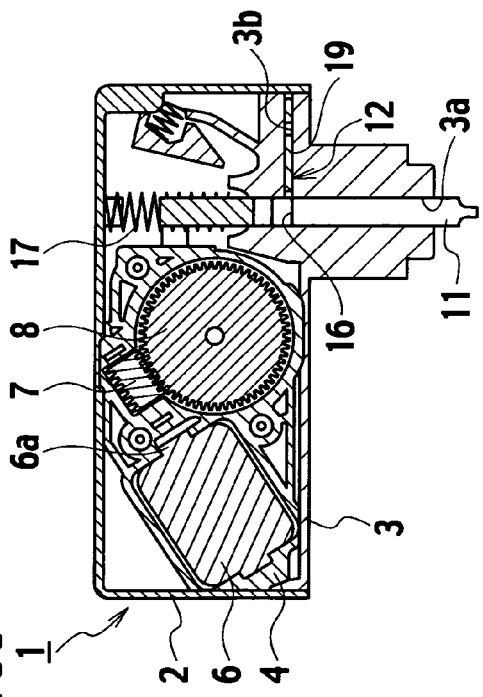
Figure 6A:
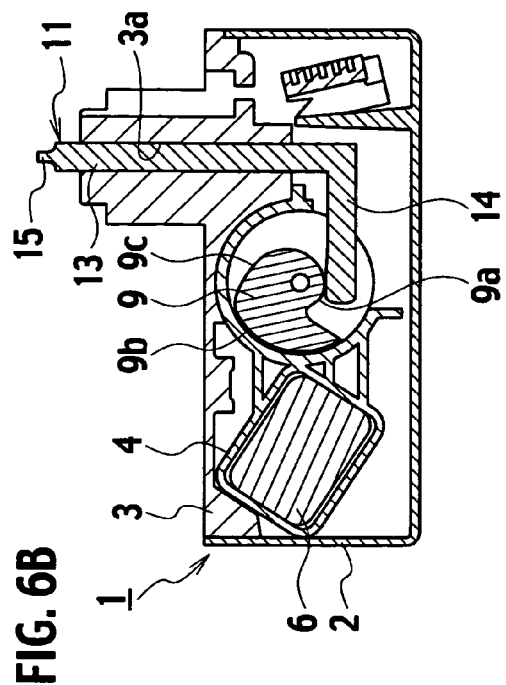
FIGS. 6A to 6D are cross-sectional views illustrating one embodiment of the present invention taken along the line 6-6 of FIG. 2.
Figure 6B:
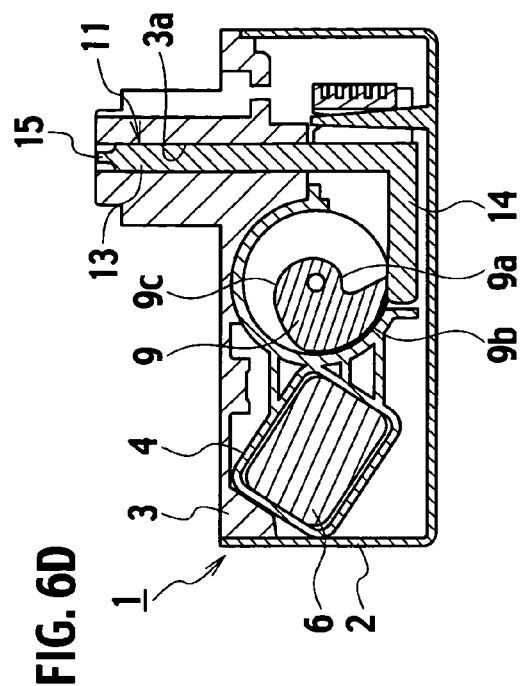
Figure 6C:
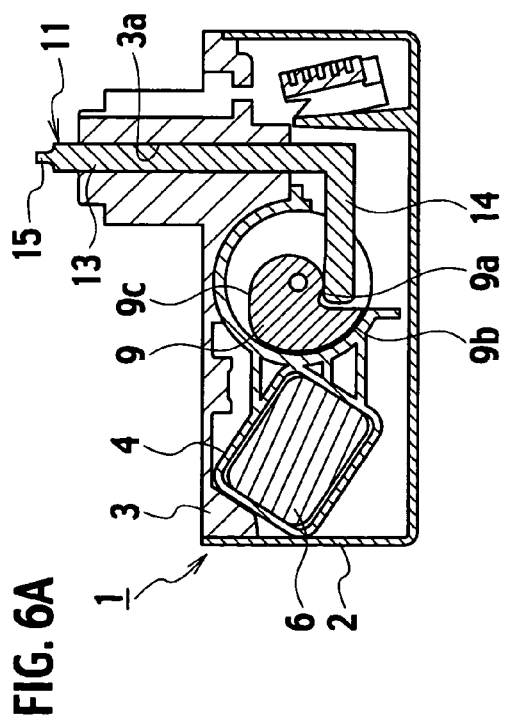
Figure 6D:
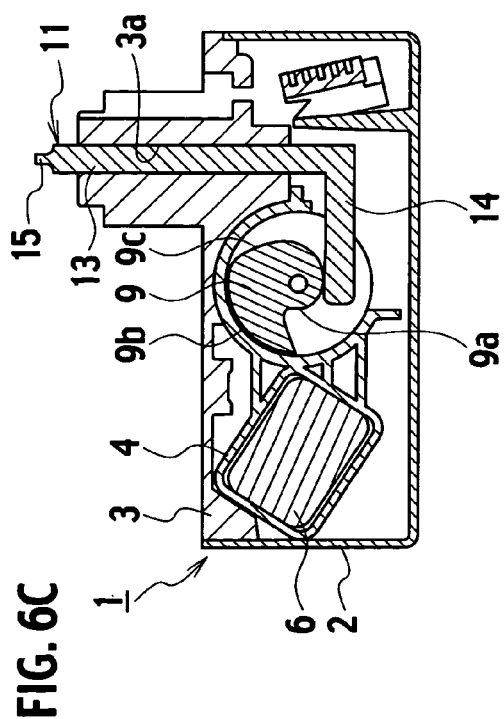
Figure 7A:
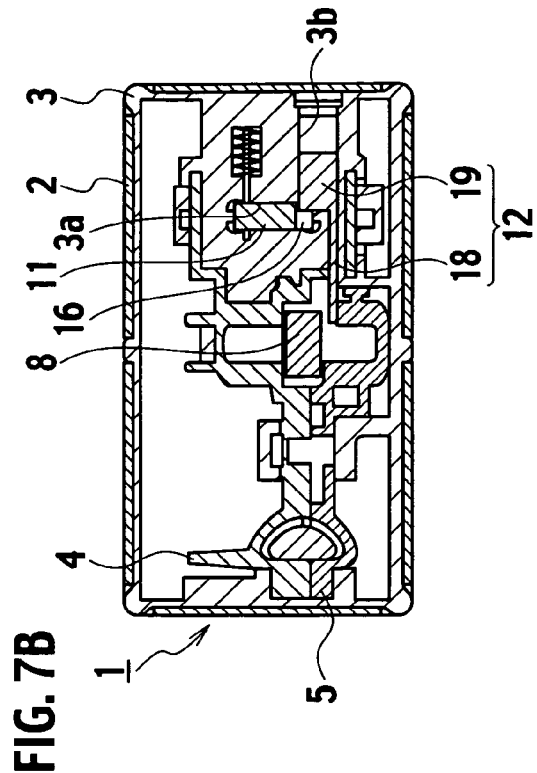
FIGS. 7A to 7D are cross-sectional views illustrating one embodiment of the present invention taken along the line 7-7 of FIG. 3.
Figure 7B:
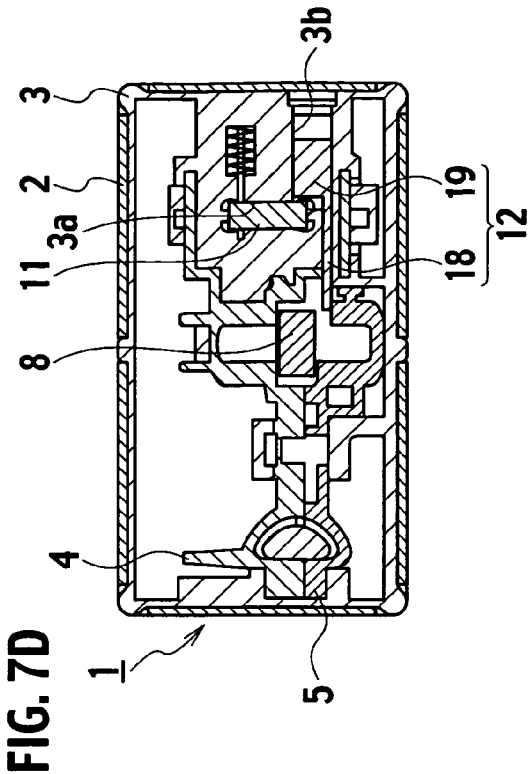
Figure 7C:
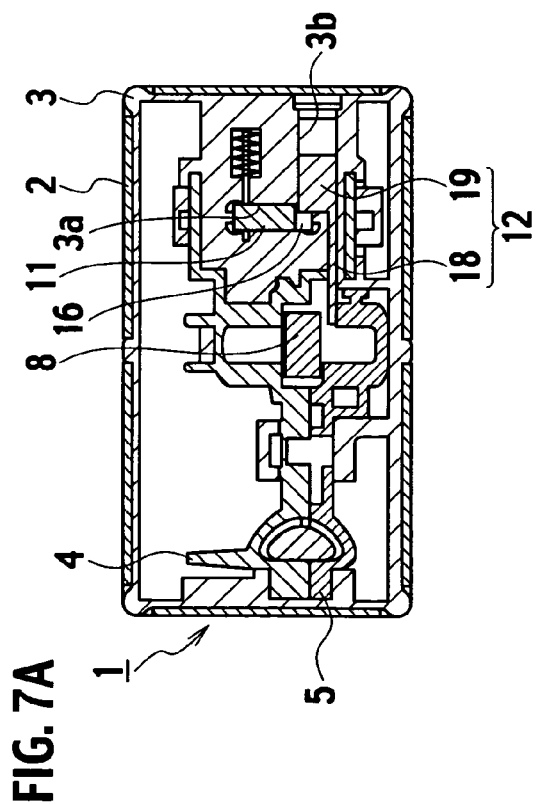
Figure 7D:
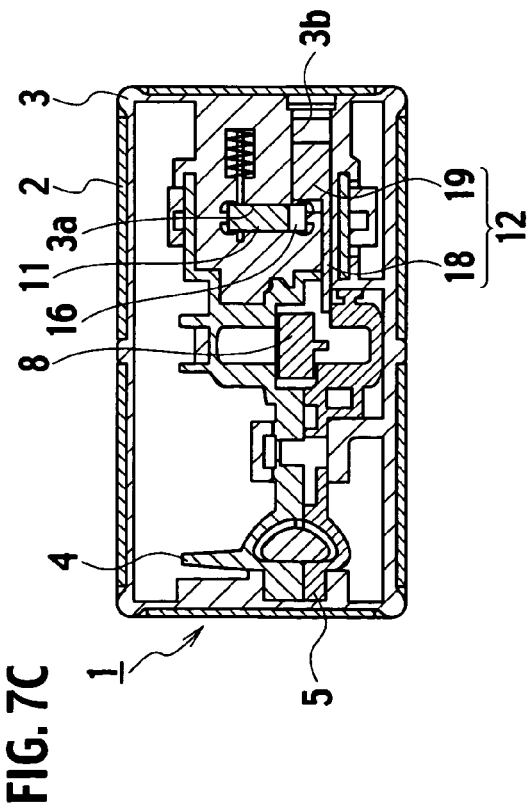

As shown in FIG. 2 to FIG. 10, the electric steering lock device 1 includes, as main configuration parts, a cover 2 and a housing 3 that are assembled to each other to form a part accommodation room at the interior thereof; a drive unit housing 4 and a drive unit cover 5 that are accommodated in the part accommodation room and that further form a drive unit room at the interior thereof; a motor 6 that is a driving source provided in the drive unit room; a worm gear 7 that is fixed to a rotation axis 6a of the motor 6; a rotating body (worm wheel) 8 that is meshed with the worm gear 7 and that is rotatably supported in the drive unit room; a first cam section 9 that is integrated with one face of the worm wheel 8; a second cam section 10 that is integrated with the other face of the worm wheel 8; a lock member 11 that slides in a direction shown by the arrow a in FIG. 4A, following the first cam section 9; a lever member 12 that slides in a direction shown by the arrow b in FIG. 4A, following the second cam 10; and a circuit substrate (not shown) provided in the part accommodation room.

As shown in FIG. 6, a cam profile of the first cam section 9 is divided to a lock position area 9a (bottom dead point area) which disposes the lock member 11 in a lock position; a unlock position area 9b (top dead point area) which disposes the lock member 11 in an unlock position; and an elevation area 9c between the lock position area 9a and the unlock position area 9b. Similarly, a cam profile of the second cam section 10 is also divided, as shown in FIG. 4, to a retention position area 10a which disposes the lever member 12 in a retention position; a waiting position area 10b which disposes the lever member 12 in a waiting position; and a lifting area 10c between the retention position area 10a and the waiting position area 10b.

Figure 8:
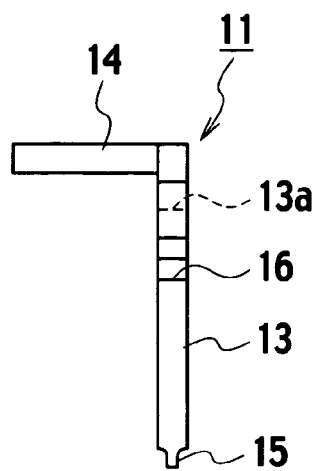
FIG. 8 is a front view illustrating a lock member provided in a steering lock device.
Figure 9:
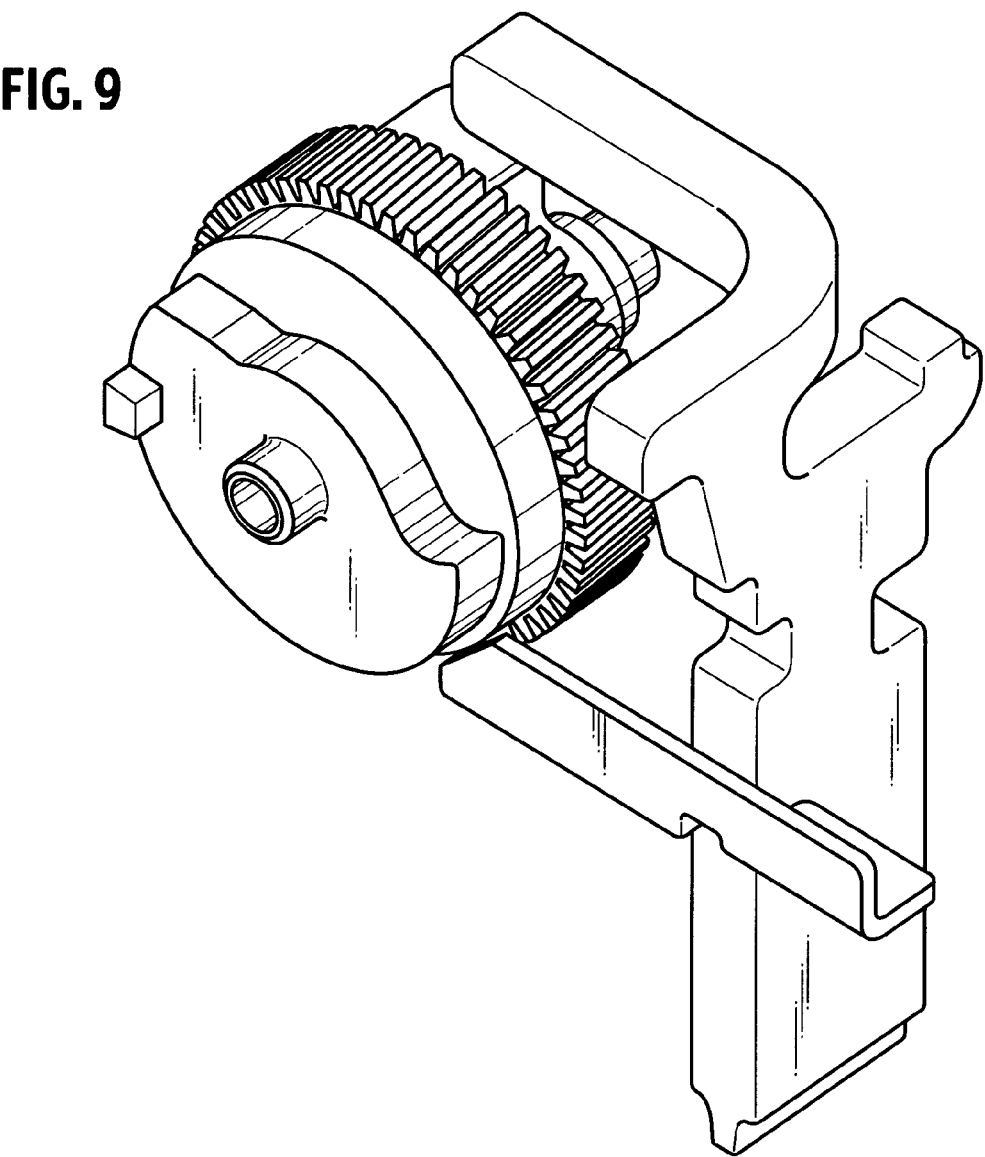
FIG. 9 is a perspective view of the main part illustrating the rotating body (worm wheel), the lock member, and the lever member in the locked status.
Figure 10:
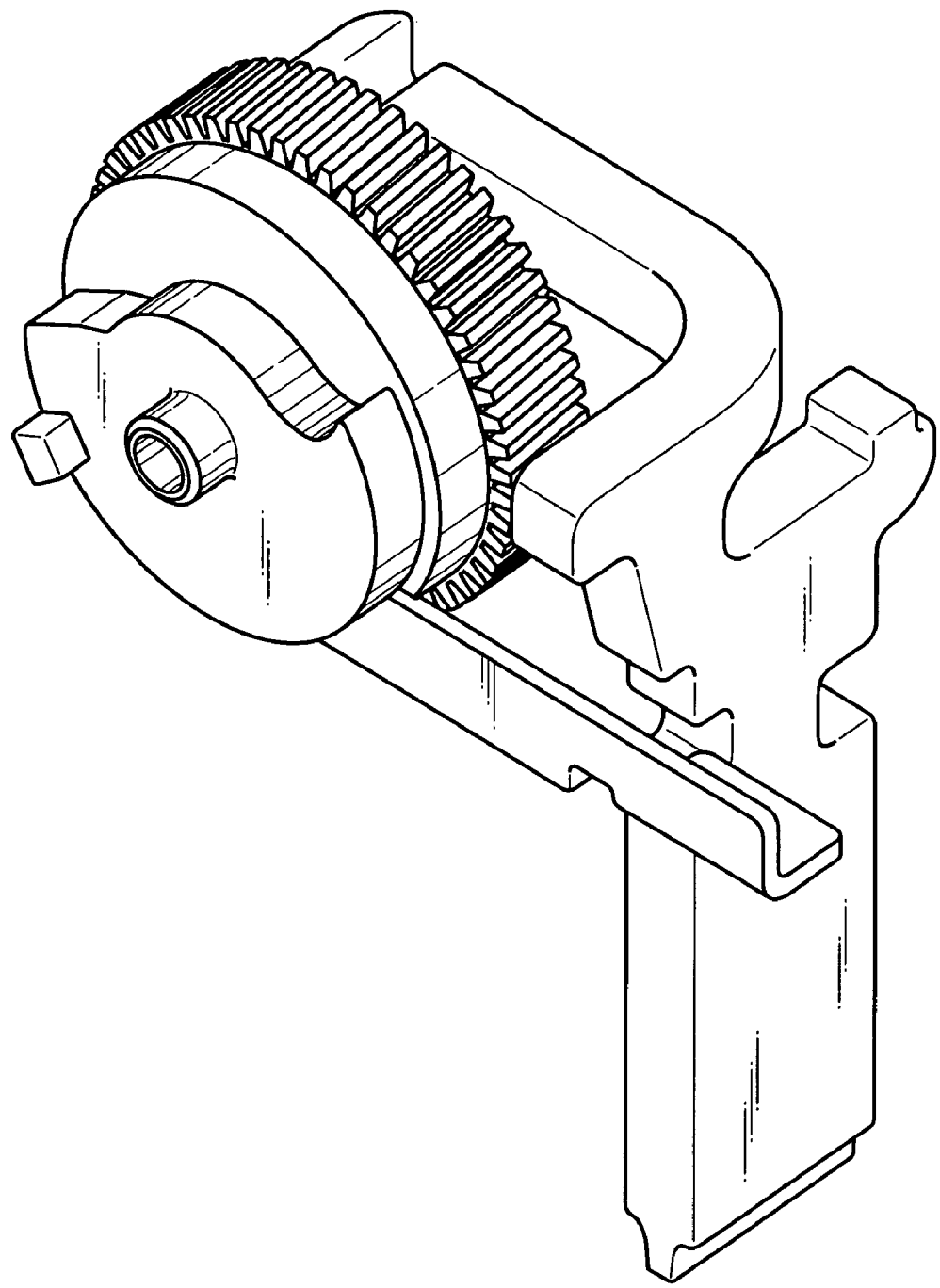
FIG. 10 is a perspective view of the main part illustrating the rotating body (worm wheel), the lock member, and the lever member in the unlocked status.

As shown in FIG. 8 to FIG. 10, the lock member 11 is composed of: a flat rod section 13 that has a flat plate-like shape and that has a spring-receiving face 13a formed by a notch; a cam engagement section 14 that is protruded in the horizontal direction from the upper side of the flat rod section 13; and a shaft locking protrusion 15 that is provided at a lower end of the flat rod section 13. At one side face of the flat rod section 13, an engagement groove 16 is provided that extends in a direction orthogonal to the direction along which the lock member 11 is moved. The flat rod section 13 is inserted to a through hole 3a of the housing 3 in a retractable manner and is supported so as to be movable in the up-and-down direction. The shaft locking protrusion 15 provided in the lock member 11 is protruded out of the through hole 3a provided in the housing 3 to the outside. The shaft locking protrusion 15 is displaced between the lock position (the positions of FIG. 4A, FIG. 5A, and FIG. 6A) at which the rotation of a steering shaft (not shown) is blocked and the unlock position (the positions of FIG. 4D, FIG. 5D, and FIG. 6D) at which the rotation of the steering shaft (not shown) is allowed. The spring-receiving face 13a and the cover 2 have therebetween a coil spring 17 whose spring force urges the lock member 11 in a direction so as to press the first cam section 9 (locking direction).

The lever member 12 is composed of: a flat plate section 18 that has one end engaged with the second cam section 10 and that is movably provided in the horizontal direction; and an engagement piece 19 that is bent with a right angle from one side of this flat plate section 18 and that is engaged with the engagement groove 16 when the lock member 11 is moved to the lock position. The lever member 12 is moved between the waiting position at which the lock member 11 is allowed to move (the positions of FIG. 4D, FIG. 5D, FIG. 6D, and FIG. 7D) and the retention position at which the engagement piece 19 is engaged with the engagement groove 16 of the lock member 11 to block the lock member 11 from moving to the lock position (the positions of FIG. 4A, FIG. 5A, FIG. 6A, and FIG. 7A). The leek lever member 12 is movably inserted to a insertion hole 3b formed in the housing 3 and is urged by a coil spring 20 towards the second cam section 10.

Next, the operation of the above electric steering lock device 1 will be described. As shown in FIG. 4A, FIG. 5A, FIG. 6A, FIG. 7A, and FIG. 9 when the lock member 11 is locked, the cam engagement section 14 of the lock member 11 is engaged with the lock position area 9a of the first cam section 9. Then, the shaft locking protrusion 15 of the lock member 11 is protruded from the housing 3 and is engaged with a steering shaft of the vehicle (not shown). This consequently blocks the rotation of the steering shaft to continuously prevent the vehicle from being maneuverable. Then, one end of the lever member 12 is engaged with the retention position area 10a of the second cam section 10. This allows the lever member 12 to be moved to the retention position to insert the engagement piece 19 of the lever member 12 to the engagement groove 16 of the lock member 11. This consequently blocks the lock member 11 from moving to the unlock position.

Next, when the rotation of the motor 6 in the unlocking direction is started, the worm wheel 8 is driven to rotate via the rotating shaft 6a and the worm gear 7. Then, as shown in FIG. 4B, FIG. 5B, FIG. 6B, and FIG. 7B, one end of the lever member 12 is engaged with the lifting area 10c of the second cam section 10. This starts the movement of the lever member 12 from the retention position to the waiting position. At this point of time, the engagement piece 19 of the lever member 12 is still being inserted to the engagement groove 16 of the lock member 11. Thus, the movement of the lock member 11 to the unlock position is blocked.

When the motor 6 is further rotated in the unlocking direction, the cam engagement section 14 of the lock member 11 is engaged with the lifting area 9c of the first cam section 9 as shown in FIG. 4C, FIG. 5C, FIG. 6C, and FIG. 7C. This starts the movement of the lock member 11 from the lock position to the unlock position. At this point of time, the shaft locking protrusion 15 of the lock member 11 is still protruded from the housing 3 and is engaged with the steering shaft and at the same time one end of the lever member 12 is engaged with the waiting position area 10b of the second cam section 10. This allows the lever member 12 to be moved to the waiting position to withdraw the engagement piece 19 of the lever member 12 from the engagement groove 16 of the lock member 11. Thus, the lock member 11 is allowed to move to the unlock position.

Next, when the motor 6 is further rotated in the unlocking direction, the unlocked status as shown in FIG. 4D, FIG. 5D, FIG. 6D, FIG. 7D, and FIG. 10 is reached. This allows the movement of the lock member 11 and the cam engagement section 14 of the lock member 11 is engaged with the unlock position area 9b of the first cam section 9. As a result, the lock member 11 is moved to the unlock position and the shaft locking protrusion 15 recedes into the housing 3. This allows the rotation of the steering shaft and the vehicle can be maneuvered.

Next, when the locked status is returned again, the worm wheel 8 is driven by the motor 6 to rotate in the locking direction. Then, the lock member 11 follows the first cam section 9 and is displaced from the unlock position to the lock position. Then, the lever member 12 follows the second cam section 10 and is moved to the retention position at which the lock member 11 is blocked from moving to the unlock position. As a result, the rotation of the steering shaft is blocked and the vehicle cannot be maneuvered.

As described above, according to the present invention, the lock member 11 is engaged with the steering shaft in a locked status and the engagement piece 19 of the lever member 12 is engaged with the engagement groove 16 of the lock member 11. This blocks the lock member 11 from moving in the unlocking direction. Thus, the lock member 11 is protected from a so-called soft attack where a small through hole is opened in the cover 2 or the housing 3 for example to directly operate the lock member 11 from outside to move the lock member 11 to the unlock position. This prevents a situation where the locked status of the steering shaft of a parked vehicle is forcedly unlocked and the vehicle is stolen. The lock member 11 is inserted to the through hole 3a provided in the housing 3 in a retractable manner, which supports the lock member 11 firmly. This protects the lock member 11 from a destructive behavior where the lock member 11 is operated from outside to forcedly unlock the lock member 11. In view of this protection, the theft protection performance of a parked vehicle (protection performance of the vehicle from theft) can also be improved. Furthermore, even when the coil spring 17 for urging the lock member 11 in the locking direction during a locked status is removed, the lock member 11 is retained at the lock position by the own weight of the lock member 11. In view of this point, the theft protection performance of a parked vehicle can also be improved.

In this embodiment, the lever member 12 is covered by the housing 3. Thus, the lever member 12 can be protected from a destructive behavior where the lever member 12 is operated from outside to forcedly unlock the lever member 12.

Furthermore, in this embodiment, the worm wheel 8 is accommodated in the drive unit room. The worm wheel 8 and the drive unit room are covered by the drive unit housing 4 and the drive unit cover 5 and also are sandwiched between the lock member 11 and the drive unit housing 4. This blocks the worm wheel 8 from being detached from outside. This can protect the worm wheel 8 from a destructive behavior where the worm wheel 8 is operated from outside to be forcedly unlocked. Furthermore, the worm wheel 8 is meshed with the worm gear 7 fixed to the rotating shaft 6a of the motor 6, which allows a self lock function of the worm wheel 8 to work when the motor 6 is stopped. This blocks the worm wheel 8 from rotating in the unlocking direction. Thus, the locked status of the steering shaft by the lock member 11 is retained. This can improve the theft protection performance of a parked vehicle.

What is claimed is:
1. An electric steering lock device, comprising:
a rotating body that is driven by a driving source to rotate in an unlocking direction and a locking direction;
a first cam section and a second cam section provided in the rotating body;
a lock member that follows the first cam section to be displaced in a direction orthogonal to a rotation axis of the first cam section between a lock position at which the rotation of a steering shaft is blocked and an unlock position at which the rotation of the steering shaft is allowed;

a housing and a cover that form a part accommodation room for accommodating the rotating body, the first cam section, the second cam section, and the lock member; and a lever member that slides, while following the second cam section, so as to be able to be engaged with or detached from the lock member, wherein:

the lever member is structured to:

be positioned, when the lock member is positioned at the unlock position, at a waiting position at which the lock member is allowed to move, and be positioned, when the lock member is positioned at the lock position, at a retention position at which the lock member is blocked from being moved to the unlock position.

2. The electric steering lock device according to claim 1, wherein:

the lock member includes an engagement groove that extends in a direction orthogonal to a direction along which the lock member is moved, and the lever member includes an engagement piece that is engaged with the engagement groove when the lock member is positioned at the lock position and the lever member is positioned at a retention position.

3. The electric steering lock device according to claim 1, wherein:

the housing includes a through hole to which the lock member can be inserted in a retractable manner.

4. The electric steering lock device according to claim 1, wherein:

the lever member is covered by the housing.

5. The electric steering lock device according to claim 1, further comprising:

a drive unit housing and a drive unit cover which form a drive unit room for accommodating the rotating body.

* * * * *